United States Patent
Janikowski et al.

(10) Patent No.: US 7,241,340 B2
(45) Date of Patent: Jul. 10, 2007

(54) SYSTEM CONFIGURED FOR APPLYING A MODIFYING AGENT TO A NON-EQUIDIMENSIONAL SUBSTRATE

(75) Inventors: Stuart K. Janikowski, Idaho Falls, ID (US); Mark D. Argyle, Idaho Falls, ID (US); Robert V. Fox, Idaho Falls, ID (US); W. Alan Propp, Idaho Falls, ID (US); William J. Toth, Idaho Falls, ID (US); Daniel M. Ginosar, Idaho Falls, ID (US); Charles A. Allen, Idaho Falls, ID (US); David L. Miller, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 6 days.

(21) Appl. No.: 10/627,530

(22) Filed: Jul. 24, 2003

(65) Prior Publication Data

US 2004/0028764 A1 Feb. 12, 2004

Related U.S. Application Data

(62) Division of application No. 09/677,336, filed on Sep. 28, 2000, now Pat. No. 6,623,686.

(51) Int. Cl.
*B05C 11/00* (2006.01)
(52) U.S. Cl. .................................. 118/64; 118/719
(58) Field of Classification Search ............... 118/419, 118/420, 733, 718, 692, 719, 667, 64–68; 34/242; 414/217; 432/242
See application file for complete search history.

(56) References Cited

U.S. PATENT DOCUMENTS

| 2,545,576 | A |   | 3/1951  | Godley          |         |
|-----------|---|---|---------|-----------------|---------|
| 2,965,067 | A | * | 12/1960 | Amelotte et al. |         |
| 3,397,672 | A |   | 8/1968  | Dykeman et al.  |         |
| 3,473,950 | A |   | 10/1969 | Wong            |         |
| 3,618,919 | A | * | 11/1971 | Beck            | 432/237 |
| 3,650,042 | A |   | 3/1972  | Boerger et al.  |         |
| 3,650,342 | A |   | 3/1972  | Boerger et al.  |         |
| 3,783,001 | A |   | 1/1974  | Marzocchi       |         |
| 4,015,558 | A |   | 4/1977  | Small et al.    |         |
| 4,285,668 | A | * | 8/1981  | Pepe            | 432/19  |
| 4,537,610 | A |   | 8/1985  | Armstrong et al.|         |
| 4,552,786 | A |   | 11/1985 | Berneburg et al.|         |
| 4,567,102 | A |   | 1/1986  | Pollett et al.  |         |
| 4,582,731 | A |   | 4/1986  | Smith           |         |
| 4,734,227 | A |   | 3/1988  | Smith           |         |

(Continued)

*Primary Examiner*—Brenda A. Lamb
(74) *Attorney, Agent, or Firm*—TraskBritt, P.C.

(57) ABSTRACT

The present invention is related to systems and methods for modifying various non-equidimensional substrates with modifying agents. The system comprises a processing chamber configured for passing the non-equidimensional substrate therethrough, wherein the processing chamber is further configured to accept a treatment mixture into the chamber during movement of the non-equidimensional substrate through the processing chamber. The treatment mixture can comprise of the modifying agent in a carrier medium, wherein the carrier medium is selected from the group consisting of a supercritical fluid, a near-critical fluid, a superheated fluid, a superheated liquid, and a liquefied gas. Thus, the modifying agent can be applied to the non-equidimensional substrate upon contact between the treatment mixture and the non-equidimensional substrate.

13 Claims, 1 Drawing Sheet

U.S. PATENT DOCUMENTS

| | | |
|---|---|---|
| 4,734,451 A | 3/1988 | Smith |
| 4,841,908 A | 6/1989 | Jacobson et al. |
| 4,961,913 A | 10/1990 | Sullivan |
| 4,970,093 A | 11/1990 | Sievers et al. |
| 5,013,366 A | 5/1991 | Jackson et al. |
| 5,032,568 A | 7/1991 | Lau et al. |
| 5,034,276 A | 7/1991 | Zwiersch et al. |
| 5,035,921 A | 7/1991 | Berneburg et al. |
| 5,055,119 A | 10/1991 | Flautt et al. |
| 5,213,851 A | 5/1993 | Snyder et al. |
| 5,313,965 A | 5/1994 | Palen |
| 5,709,910 A | 1/1998 | Argyle et al. |
| 5,977,348 A | 11/1999 | Harris et al. |
| 5,997,956 A | 12/1999 | Hunt et al. |
| 6,495,204 B1 * | 12/2002 | Allen et al. |
| 6,660,086 B1 * | 12/2003 | Prince et al. |

* cited by examiner

SYSTEM CONFIGURED FOR APPLYING A MODIFYING AGENT TO A NON-EQUIDIMENSIONAL SUBSTRATE

RELATED APPLICATION

This application is a divisional application of U.S. patent application Ser. No. 09/677,336, filed Sep. 28, 2000 now U.S. Pat. No. 6,623,686 and is incorporated by reference.

CONTRACTUAL ORIGIN OF THE INVENTION

The United States Government has certain rights in this invention pursuant to Contract Nos. DE -AC07-94ID13223, DE-AC07-99ID13727, and Contract No. DE-AC07-05ID14517 between the United States Department of Energy and Battelle Energy Alliance, LLC.

FIELD OF THE INVENTION

The present invention is related to systems and methods for modifying various non-equidimensional substrates with modifying agents.

BACKGROUND OF THE INVENTION

Methods have been developed for the coating or modification of various substrates including metals, alloys, organometallics, salts, optical fibers, filaments, cables, glass fibers, graphite fibers, fiberglass, structural polymers, single strand polymers, filamentous polymers, composites, and the like. For example, polystyrene is known to be a good coating for glass optical fibers to increase durability. These coatings, however, are generally applied in a variety of ways with chemical treatment processes. Some of these methods of chemical treatment (for coating, impregnation, surface modification, etc.) include solvent-based systems and melt-based systems. Additionally, with respect to non-equidimensional substrates, thermoplastics and other coatings have been applied by various methods.

Solvent-based chemical treatment systems can include organic or inorganic materials in solutions such as aqueous solutions wherein the organic or inorganic material is dissolved, suspended, or otherwise dispersed in the solution. In the area of coating of glass fibers, U.S. Pat. Nos. 5,055,119, 5,034,276 and 3,473,950 disclose examples of such chemical treatments. Typically, with chemical treatment of some of the prior art, solvents are used to lower the viscosity of the chemical treatment to facilitate wetting of the glass fibers. The solvent is substantially unreactive with the other constituents of the chemical treatment and is driven out of the chemical treatment after the wetting of the glass fibers. In each process for applying solvent-based chemical treatments, an external source such as heat can be used to evaporate or otherwise remove the water or other solvent from the applied chemical treatment, leaving a coating of organic material on the glass fibers. With melt-based chemical treatment systems, thermoplastic-type organic solids can be melted and applied to various fibrous structures. Again, in the area of glass coating, U.S. Pat. Nos. 4,567,102, 4,537,610, 3,783,001 and 3,473,950 disclose examples of such melt-based chemical treatments of glass fibers. These methods and others have been used in the prior art to coat various elongated materials including textile yarns, monofilaments, bundles of monofilaments, and fibrous structures.

Supercritical fluids have been used previously to coat elongated materials such as fibers, metals, and the like. However, when such supercritical fluids have been used, they have typically been applied by one of a few methods. Several of these techniques involve the application of one or more modifying agent by batch soaking in an enclosed chamber. Other methods include processes based upon spraying from a pressurized chamber through a narrow nozzle.

With regard to spray-on deposition, air pressure sprayers have been used to contain supercritical and near-critical fluids (carriers) containing coating material. Upon spraying of the fluid onto the substrate, the supercritical fluid carrying the coating material leaves the high pressure environment and is exposed to a normal atmospheric environment. Thus, the supercritical fluid is exposed to low pressure and evaporates, leaving behind the coating material or modifying agent which modifies the substrate. Examples of typical spray depositions of the prior art include U.S. Pat. Nos. 4,582,731, 4,734,227, 4,734,451, 4,970,093, 5,032,568, 5,213,851, and 5,997,956. Regarding supercritical fluid batch processes, the substrate is typically immersed and then the pressure is dropped, depositing the coating. This is usually followed by a drying stage. In a related embodiment, fluorocarbon polymers can be used to enhance solubility of polar components in supercritical fluid. However, this is still a batch process.

Though the use of liquified gas, supercritical fluids, and near-critical liquids and gases have been used to coat solid or other fibrous substrates in the prior art, none presently known by the applicant appear to provide a system and method for modifying non-equidimensional substrates in a continuous system that does not utilize spray-on or batch coating processes.

SUMMARY OF THE INVENTION

The present invention is drawn to a system configured for applying a modifying agent to a non-equidimensional substrate. The system comprises a processing chamber configured for applying a modifying agent to the substrate. A pair of end seals are also disclosed which can be configured for accepting the shape of the non-equidimensional substrate to be coated. For example, if end seals are used and the substrate is flat or sheet-like, then the seals should be large enough and configured appropriately to accept the substrate into the system. Preferably, the seals can be configured to generally match (in a slightly larger manner) the shape of the non-equidimensional substrate such that seal fluids (if used) and process chamber fluids cannot substantially leak into the surrounding atmosphere. A passageway is provided within the device configured for passing the substrate through the first end seal, the processing chamber, and the second end seal in series. Though not required, at least one expansion chamber can be disposed between each of the end seals and the processing chamber.

Additionally, a method of continuously modifying a non-equidimensional substrate with a modifying agent is disclosed. The method of modifying the non-equidimensional substrate comprising the steps of: providing a treatment apparatus chamber having a passageway configured to pass the non-equidimensional substrate entirely therethrough; providing a treatment mixture comprising a modifying composition in a carrier medium, wherein the carrier medium is selected from the group consisting of a supercritical fluid, a near-critical fluid, a superheated fluid, a superheated liquid, and a liquefied gas; passing the non-equidimensional substrate continuously through the passageway; and flowing the treatment mixture into the passageway during movement of the non-equidimensional substrate through the passageway.

BRIEF DESCRIPTION OF THE DRAWINGS

In the accompanying drawing which illustrates an embodiment of the invention.

DETAILED DESCRIPTION OF THE INVENTION

Before the present invention is disclosed and described, it is to be understood that this invention is not limited to the particular configurations, process steps and materials disclosed herein as these may vary to some degree. It is also to be understood that the terminology used herein is used for the purpose of describing particular embodiments only, and is not intended to be limiting as the scope of the present invention. The invention will be limited only by the appended claims and equivalents thereof.

It must be noted that, as used in this specification and the appended claims, singular forms of "a," "an," and "the" include plural referents unless the content clearly dictates otherwise.

Figure 2:
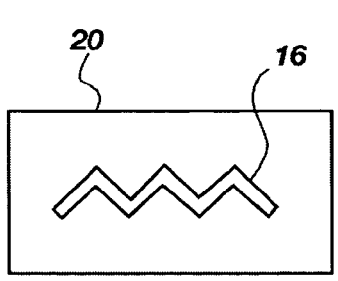
FIGS. 2, 3, and 4 show various embodiments of end seals that can be used with the present invention.
Figure 3:
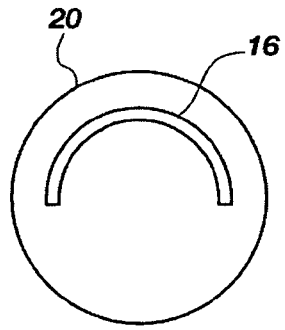
Figure 4:
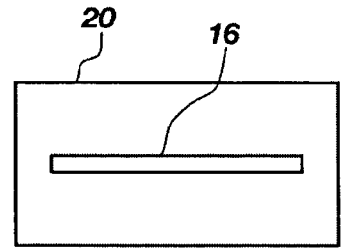

For the purposes of this document, "non-equidimensional substrate" can include any structure that can be fed through the continuous system of the present invention, which has a non-equidimensional cross-sectional footprint perpendicular to the direction of travel. For example, a cylinder would be considered equidimensional, whereas a square bar or ribbon would be considered non-equidimensional. More specifically, metals, alloys, inorganics, organometallics, solid organics, natural fibers and natural materials, salts, minerals; structural, construction, and high-strength polymers; single-strand polymers, multiple strand polymers; filamentous, sheet or woven materials or polymers; ribbon and ribbon-like materials, screens and screen-like materials, and the like, can be non-equidimensional as defined herein. These and other materials can be of any non-equidimensional cross-sectional shape or length, including, but not limited to non-circular fibrous or filamentous materials, non-circular rods, sheets, bars, screens, textile and non-textile fabrics, layered or plied materials, mats, flat stock, square stock, channel stock, angle stock, corrugated material, cast molded, extruded formed or otherwise irregular shaped materials, and the like. Additional examples can include multiple structures of circularly symmetrical structures (or otherwise equidimensionally cross-sectioned structures) arranged in a side-by-side, top-to-bottom, encircled about each other, or otherwise arranged in an adjacent manner so as to present a non-equidimensional cross-sectional footprint, or facial print in the direction co-linear to travel through the device. FIGS. 2, 3 and 4 depict end seals whereby multiple symmetrical structures of appropriate size may be passed therethrough the device in such an adjacent arrangement. Thus, structures arranged as such including ropes, wires, cables, yarns, threads, circular rods, round stock, splines, and the like, are included within the scope of the present invention.

"Supercritical fluid" shall be defined as a carrier or a carrier/chemical modifier mixture which is at a temperature above its critical temperature.

"Near-critical fluid" includes conditions where the carrier is either at or below the critical temperature or pressure for the carrier (or carrier with the chemical modifier) wherein the properties of the mixture are at a state where they begin to approach those of a supercritical fluid. Near-critical fluid can further be divided into subcatagories "near-critical gas phase" and "near-critical liquid phase" depending on the state that the fluid is in. "Near-critical gas phase" exists at pressures either less than or equal to the critical pressure and less than the bubble point pressure with temperatures somewhat below to above the critical temperature ($0.9T_c$ and above). "Near-critical liquid phase" is defined as the phase that exists at temperatures either less than or equal to the critical temperature and pressures either greater than or equal to the bubble point pressure of the carrier and/or the carrier and the chemical modifier.

"Liquefied gas" includes all gases that are at a temperature and/or pressure where they are in a liquid state, but can readily be changed to a gaseous state by altering the temperature or pressure.

"Superheated fluid" shall be defined as all liquids that can readily be changed to a gaseous state by reducing the pressure. Typically, this is a liquid which is heated above the temperature at which a change of state would normally take place without any change of state having occurred. An example would be pressurized water above 100° C. at sea level.

"Superheated liquid" shall be defined a liquid, which is heated above the temperature at which a change of state would normally take place, without said change of state having occurred. An example would be pressurized water above 100° C.

"Modifying agent" and "modifying composition" can be used interchangeably and shall include any substance used for chemical or non-chemical modification of a substrate. Thus, organic coatings, inorganic coatings, reactive coatings, sensor coatings, catalytic coatings, conductive coatings, material expanders, impregnators, extractors, surface functionalizers, and other modifiers are included within the present definition.

"Fluid" or "critical fluid" used generically shall include supercritical fluid, near-critical fluid, superheated fluid, a superheated liquid, and liquefied gas, unless the context clearly dictates otherwise.

"Treatment mixture" or "process fluid" shall include any mixture of a carrier (preferably a fluid carrier as defined above) and a modifying agent.

Figure 1:
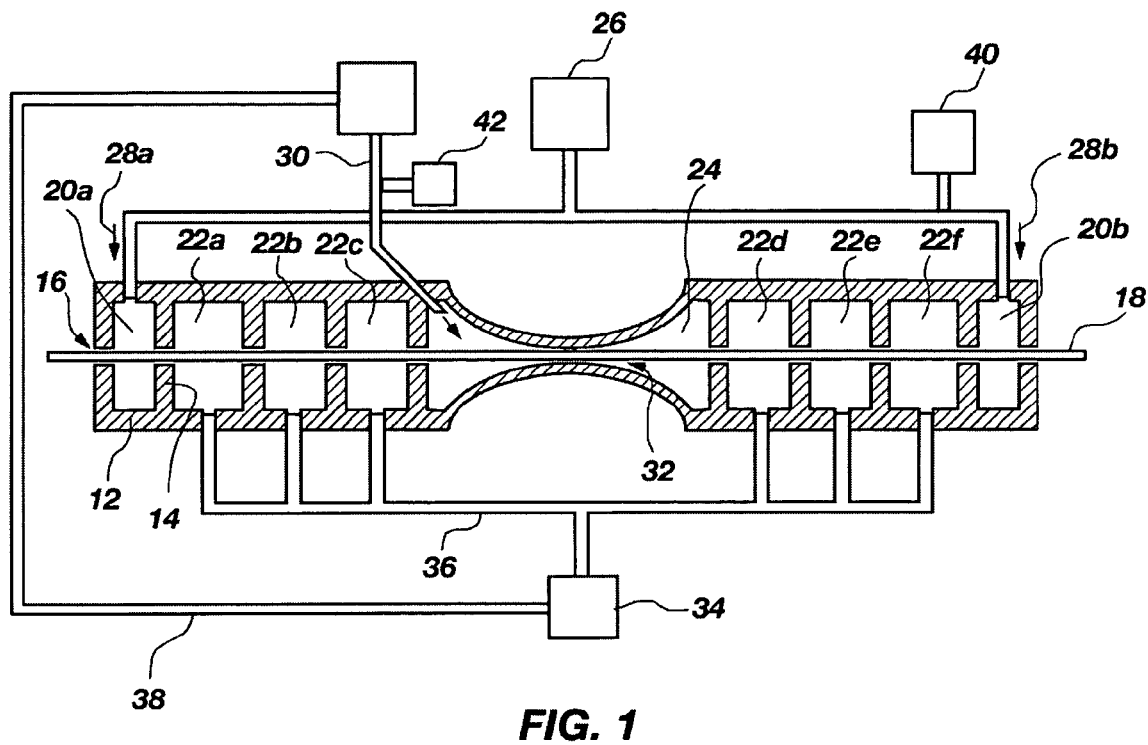
FIG. 1 is a schematic representation of an embodiment of the system of the present invention.

Turning now to FIG. 1, a schematic representation of the system of the present invention is shown. A housing 12 is shown having a plurality of baffles 14 which define a series of openings 16 for allowing a non-equidimensional substrate 18 therethrough. The baffles 14 can be adjustable for allowing various sizes and shapes of substrates to pass through the system. Specifically, the substrate shown in FIG. 1 is a single edge view of a sheet-like substrate.

Three different types of chambers are shown which include end seals 20$a,b$, expansion chambers 22$a,b,c,d,e,f$, and a processing chamber 24 having a constricted medial region 32. The end seals 20$a,b$ are maintained at a desired pressure by a seal fluid using a seal fluid regulator 26. If the end seals are to be maintained at different pressures, then at least one pressure regulator 40 can be used. A positive flow 28$a,b$ of seal fluid is maintained within the end seals 20$a,b$ such that any fluids within the device are not allowed to substantially leak into the atmosphere. Because the device is configured for non-equidimensional substrates, the end seals the openings can be configured to essentially match the substrate dimensions, with the opening being slightly larger than the dimensions of the non-equidimensional substrate. Such configurations can be seen in the end views shown in FIGS. 2 to 4 below.

The processing chamber 24 is the chamber where the substrate is modified by the modifying material. Essentially, a process fluid comprised of a carrier (which can be a supercritical fluid, a near-critical fluid, a superheated fluid, a superheated liquid, or a liquified gas) and a modifying material (for coating or otherwise modifying the substrate) are fed into the processing chamber 24 through an injector 30. As the injector 30 injects the process fluid toward the constricted area 32 of the processing chamber 24, the pressure drops and causes carrier to release or precipitate out the modifying material effectuating the modification of the substrate. Though the processing chamber shown has a constricted region, this is not required. In fact, other chambers shapes can be used where the modification of the non-equidimensional substrate can be modified, provided the a passageway is provided through the entire chamber that allows for the continuous feed of the non-equidimensional substrate. Additionally, though not required, a temperature regulator 42 can be present for temperature control of the process fluid.

The expansion chambers 22a,b,c,d,e,f are used, in part, to collect any seal fluid or processing fluid, i.e., carrier and/or modifying material, and can be maintained at desired pressures (depending upon the pressure and/or temperature of each fluid and the configuration of the expansion chambers and/or baffles 14). In one embodiment, expansion chambers 22a,b,c can be used to ratchet up the pressure sequentially in preparation for applying a modifying composition to the substrate. Thus, chamber 22b can be a higher pressure than expansion chamber 22a and a lower pressure than 22c. Conversely, expansion chambers 22d,e,f can be used to ratchet down the pressure for reentry of the substrate into ambient pressures. Thus, expansion chamber 22e can have a higher pressure than expansion chamber 22f and a lower pressure than expansion chamber 22d. Any process fluid or seal fluid injected into the system can be collected from the expansion chambers 22a,b,c,d,e,f and sent to a collection area 34 through a series of conduits 36. If the desire is to recycle the treatment mixture for further use, then the treatment mixture can be sent to the injector 30 through a recycling line 38.

Turning now to FIGS. 2 to 4, various end views of devices of the present invention are shown. Each of these end views are configured to accept a different shaped non-equidimensional substrates. FIG. 2 shows an end seal 20 having an opening 16 configured to accept a corrugated substrate. FIG. 3 shows an end seal 20 having an opening 16 configured to accept a U-shaped substrate. FIG. 4 shows an end seal 20 having an opening configured to accept a sheet-like substrate. The present invention can also be configured to accept other non-equidimensional shapes.

With these figures in mind, various non-equidimensional substrates can be modified according to the systems and methods disclosed herein. Specifically, the present invention is drawn to a system for applying a modifying composition to a non-equidimensional substrate. The system comprises a processing chamber configured for passing the non-equidimensional substrate therethrough, wherein the processing chamber is further configured to accept a treatment mixture into the chamber during movement of the non-equidimensional substrate through the processing chamber. The treatment mixture can comprise the modifying agent in a carrier medium wherein the carrier is preferably selected from the group consisting of a supercritical fluid, a near-critical fluid, a superheated fluid, a superheated liquid, and a liquefied gas. The modifying agent can then be applied to the non-equidimensional substrate upon contact between the treatment mixture and the non-equidimensional substrate.

In one embodiment of the invention, the processing chamber can have a first region, a second region, and a constricted medial region between the first region and the second region. Thus, when the modifying agent can be separated from the carrier medium upon a pressure drop when the treatment mixture is introduced into the constricted medial region. The pressure drop can cause the modifying agent to be applied to the substrate.

Though not required, the use of end seals, i.e., entry seal and exit seal, can produce desired results. For example, an entry seal that essentially matches and is slightly larger than the non-equidimensional substrate can be used to substantially prevent process fluid loss and maintain an appropriate pressure within the system. Similarly, an exit seal can provide a similar function. Typically, the non-equidimensional substrate can be removed from the exit seal at the same rate that the non-equidimensional substrate is continuously fed into the chamber through the entry seal.

Appropriate non-equidimensional substrates can include sheet-like substrates, U-shaped substrates, angled substrates, corrugated substrates, etc. If, for example, a sheet-like substrate is to be modified by the system disclosed herein, then plates, ribbons, sheets, screens, and plied materials are among the possible candidates for coating or otherwise modifying.

Expansion chambers can also be used with the present system. If expansion chambers are used, at least one expansion chamber can be disposed between the entry seal and the processing chamber, and at least one expansion chamber can be disposed between the exit seal and the processing chamber. In such a configuration, the entry seal and the exit seal can be fluid filled chambers which maintain a pressure that is at least slightly greater than the adjacent expansion chambers. Thus, the system can be maintained essentially isolated from the surrounding atmosphere. In one embodiment, the fluid pressure is maintained by continuous inflow of a gas. Though not required, the gas used in the end seals can be inert with respect to the treatment mixture so that the seal gas does not interfere with the process fluids.

A method of modifying a non-equidimensional substrate is also disclosed comprising providing a treatment apparatus chamber having a passageway configured to pass the non-equidimensional substrate entirely therethrough; providing a treatment mixture comprising a modifying composition in a carrier medium, wherein the carrier medium is selected from the group consisting of a supercritical fluid, a near-critical fluid, a superheated fluid, a superheated liquid, and a liquefied gas; passing the non-equidimensional substrate continuously through the passageway; and flowing the treatment mixture into the passageway during movement of the non-equidimensional substrate through the passageway.

In one embodiment, the passageway comprises a first region, a second region, and a constricted medial region between the first region and the second region. Thus, the treatment mixture can be flowed through the constricted medial region during movement of non-equidimensional substrate through the passageway such that the modifying composition is separated from the carrier medium and applied to the non-equidimensional substrate upon a pressure drop. In some instances, the pressure drop can cause a rapid expansion of the carrier.

In many circumstances, it may be desirable to remove the carrier medium and unused modifying composition from the passageway. The removal of the carrier medium can be controlled by pressure regulators, and the regulated pressures can be different from one expansion chamber to the next. Thus, a removal step can be part of the system and method disclosed herein. Once removed, the carrier medium and the unused modifying composition can be recycled for reuse if desired.

Additionally, injectors can be used to infuse treatment mixtures or other process fluids into the processing chambers. The injector can be configured to inject the process fluids tangentially, perpendicularly, or at any other functional angle. For example, a tangentially angled injector could be used in a chamber having two larger opposing regions, separated by a constricted medial region. Additionally, multiple injectors can be used to ensure that all surfaces of the non-equidimensional substrate can be appropriately modified. Alternatively, a perpendicular injector at close proximity to a substrate could be used to impregnate the substrate with higher pressure injections. In another embodiment, the processing chamber can utilize a treatment mixture comprised of the modifying agent and a carrier for applying the modifying agent, wherein the carrier is selected from the group consisting of supercritical fluid, near-critical fluid, superheated fluid, a superheated liquid, and liquefied gas.

An extraction or collection chamber can be fluidly coupled to the processing chamber for periodically or continuously removing unused material, i.e., seal fluids, carrier, and/or modifying agents, from the processing chambers. If expansion chambers are present, then the collection chamber can be fluidly connected to the processing chamber through the expansion chambers. If desired, the fluids collected in the collection chambers can be recycled for further use. In some instances, a further processing step may be required as could be ascertained by one skilled in the art.

The end seals can be gas (or other fluid) filled seals. However, gas filled seals are not the only functional seals that can be used. For example, these seals can simply be configured as a physical constriction or other barrier that is functional with the present system. If a gas filled seal is used, exemplary gases for use can include air, carbon dioxide ($CO_2$), nitrogen ($N_2$), helium, argon, nitrogen dioxide ($NO_2$), or other compatible process solvents or fluids. In one embodiment, the gas used in the seals can be essentially inert to the modification process that is occurring in the nearby processing chambers.

Any parameter can be used to separate the processing chamber from the exterior environment such as temperature, pressure, or chemical and solvent selection. The end seals can either be controlled by a single fluid compressor, or each seal can be individually controlled by its own compressor, pressure regulator, or combination of compressor and pressure regulator. In either case, it is preferred that the gas (or fluid) pressure within all of the seals be at least slightly greater than the nearest chamber, i.e, expansion chamber or processing chamber, to prevent escape of the process fluids.

As mentioned, FIG. 1 shows three expansion chambers and a seal chamber on each side of the process chamber. However, more or less may be required depending on the application and pressure requirements of the specific application. Thus, prior to entry or exit from the device to normal atmospheric pressure (or other desired exterior pressure), a smoother pressure transition from the pressure inside the device to the pressure outside the device can be effectuated. With some applications, heaters can be used to maintain temperatures in a specific chamber. Control of chamber pressures and temperature allows each process application to have its own unique set of pressure and temperature conditions.

With respect to the substrates that can be used with the present device, any functional non-equidimensional substrate is contemplated. However, some appropriate substrates can include woven textiles forming fabrics, metals, alloys, organometallics, composites, salts, groups fibers, groups of filaments, groups of glass fibers, groups of graphite fibers, fiberglass, structural polymers, organic polymers, inorganic polymers, glasses, ceramics, super cooled liquids, and combinations thereof. Additionally, no matter what substrate is used, the modification can be in form of a coating, impregnation, expansion of the substrate, extraction from the substrate, functionalization of the surface, forming of a composite, and other desirable modifications as could be ascertained by one skilled in the art. If a coating is the modification being applied, then coatings such as organic coatings, inorganic coatings, reactive coatings, sensor coatings, catalytic coatings, conductive coatings, and combinations thereof can be effectuated.

In the area of textiles, a system for dying or sizing textile yarns has been disclosed that departs from typical batch processes previously known. Specifically, U.S. Pat. No. 5,709,910, the entire teachings of which are incorporated herein by reference, discloses methods for applying textile treatment compositions to textile materials. This system comprising a conduit member which includes a passageway having a first end, a second end, and a medial portion with a constricted (narrowed) region. The passageway may include at least one baffle having an opening therethrough. In the system, a yarn strand is then moved through the passageway. A sizing agent or dye is dissolved in a supercritical fluid or liquified gas which is thereafter introduced into the constricted region. As the supercritical fluid or liquified gas is forced through the constricted region, the pressure drops and the supercritical fluid or liquified, gas changes in properties such that delivery of the treatment dye or sizing agent to the yarn is effectuated. The textile strands or yarn that may be sized or dyed include any textiles yarns such as cottons, linens, polyesters, nylons, rayons, cotton blends, and the like. The textile yarns disclosed therein are lower strength yarns that are comprised of a series of short strand fibers that are spun together to form longer yarn products. Thus, stray fibers are inevitable and thus, provides the need for the use of lubricants, i.e., sizing agents, described therein. The temporary lubricant acts to reduce the number of stray fibers that may be damaged by any high speed equipment that may be used in the process of preparing textiles, as well as reduce the friction between textile fibers during weaving. An additional function can include the strengthening of the yarn. Though such a system and method have been shown to be effective for the sizing and dying of yarns, no device or method is currently known that utilizes a processing chamber to modify non-equidimensional substrates a continuous feed system. Such a system allows for the use of enhanced chemical and physical properties of fluids under supercritical, near-critical, superheated, and liquified gas conditions, including solvating power, to treat the listed substrates in a continuous, efficient manner without the use of such structures as nip rollers. The device upon which the process is based also allows for the recovery of process energy and fluids to minimize waste.

The chemical compositions that can be applied with the system of the present invention include both organic and inorganic materials including various chemical reagents, monomers, polymers, etc. These chemicals include, but are not limited to, various types of inorganic compounds, organic compounds, and polymeric materials including acrylates, acrylic acid monomers, acrylic acid polymers, salts of acrylic acid copolymers, salts of polyacrylic acid, polyacrylates, polyvinyl chlorides, polyvinyl acetate, polyvinyl alcohols, cellulose derivatives, alginates, gums and starches, polyamides, polyimides, urethanes, polyurethanes, synthetic and natural resin varnishes, lacquers, polyphosphazenes, polyesters, polystyrenes, silicones, epoxies, fluoropolymers, etc. Chemical materials can be applied individually, sequentially, or as mixtures. Generally, the chemical modifiers or coatings can be in the form of organic coatings, inorganic coatings, reactive coatings, sensor coatings, catalytic coatings, conductive coatings, material expanders, impregnators, extractors, surface functionalizers, and other modifiers can be used with the present invention.

Turning to an individual discussion of the various type of substrate modifications that can occur, various modification methods are exemplified. The process parameters used to modify a non-equidimensional substrate, e.g., apply a coating, are highly dependent upon the modification material and the particular solvent used as the carrier fluid. Temperature and pressure, time of fluid exposure to the modifying material, and factors like turbulence, ultrasound, mechanical mixing, etc., can affect the solubility of the modifying material and rate at which the modifying material can be dissolved into the fluid. A suitable range for temperature and pressure is that defined by the following: $0.9T_c \leq T \leq 2T_c$ where T and $T_c$ are expressed in degrees Kelvin, and $0.1P_c \leq P \leq 20P_c$ where P and $P_c$ are expressed in any suitable pressure units.

The first equation states that the useable operating temperature (T) for the solvent has a value equal to, or greater than 0.9 times the value of the critical temperature ($T_c$), and less than or equal to 2 times the critical temperature. The second equation is similarly states that the useable operating pressure (P) for the solvent has a value equal to, or greater than 0.1 times the value of the critical pressure ($P_c$), and less than or equal to 20 times the critical pressure. In general, it is desirable to saturate the fluid with the modifying material or dissolve an amount close to the saturation limit, but any level of solubilization will achieve the effect of substrate modification. In practice, such modifications are dependent upon the choice of solvent and solute, and thus, the range can be quite extensive. Two examples are given that illustrate this feature.

To impregnate a sheet of poly(methyl methacrylate) (PMM) with pyrene to make a chemical sensor, one would dissolve 0.001 mole % pyrene in supercritical carbon dioxide (within the temperature and pressure conditions established above) and expose the PMM to the supercritical solution. Note that this is an extremely dilute solution and the modification occurs well below saturation.

An example illustrating the opposite extreme where the solute is at 100 mole % (i.e. the solute is the solvent) would be the coating of an optical disk with a poly-fluorinated hydrocarbon (PFH). In this example, one would bring the PFH to within the conditions described above and expose the disk to the solvent/solute to achieve the desired coating.

Useable concentrations for other solvent/solute mixtures are intermediate between the values given above and are largely governed by the solubility of the solute in the particular supercritical fluid. The range extends from those that have very small solubility to those that are completely miscible. An example of the first is given above, while an example of the latter would be the use of tributyl phosphate (TBP) dissolved in supercritical carbon dioxide to be used as a decontamination solvent. In this case the solvent ($CO_2$) can be used in smaller proportion than the TBP and even below 10 mole percent.

With these working conditions in mind, various modifications can be discussed in greater depth. With respect to organic and inorganic coatings, functional coatings intended to impart some physical attribute to the substrate being coated are included. Some physical attributes can include imparting corrosion resistance, degradation resistance, abrasion resistance, hardness, lubricity, light (or other radiation) reflective or absorptive properties, ductility, elasticity, material thickness, magnetic susceptibility, radiation degradation resistance, stress relief or resistance, thermal tolerance, and other similar attributes. Another function might be to encapsulate the coated material to restrict or modify the movement of chemicals across the coating. The nature of these coatings is that they are superficial and comprise a coating or barrier between the coated material and the external environment.

Organic modifiers or coatings can be comprised in majority or entirely of organic materials. Such organic coatings can include occluded particles or co-deposited organic materials or inorganic materials. In one embodiment, polystyrene in a fluid acetone can be applied to woven glass cloth to increase durability. In another embodiment, varnish in a fluid paint thinner can be applied to sheet copper or copper ribbons to impart electrical insulating properties. In these and other embodiments, urethane or latex with or without nano-sized titania can be applied during the coating process or subsequent to coating and prior to drying of the organic, respectively.

Another coating type includes inorganic coatings. These coatings can be comprised of a majority or entirely of inorganic or non-organic materials, though occluded or co-deposited organic materials or other inorganic materials can also be present. Examples of inorganic coatings include metal and non-metal oxides, silicon, sulfur, or phosphorus-based polymers that may include dopants comprised of metals, organometallics, inorganics, hetero-atomic organics, minerals, or salts. In one example, silicone in a fluid petrolium ether can be applied to graphite to impart a dielectric coating.

Reactive coatings refers to functional coatings intended to impart chemical reactivity or a specific chemical nature to various substrates, particularly with respect to otherwise inert or un-reactive materials. Many coatings can be both reactive or non-reactive depending upon the environment surrounding the coating or the specific application for the coating. For example, in the prior art, polyvinyl alcohol has been used as an un-reactive coating to temporarily lubricate a textile fibers. However, as part of the present invention, polyvinyl alcohol can be used as a coating on linear gasket materials to impart chemical degradation resistance toward gasoline and other petroleum products.

Sensor coatings are those coatings that interact with the surrounding environment in a manner that changes one or more of their chemical or physical properties. This sensor characteristic can be used to sense changing conditions in an environment. Sensor materials can be reactive or non-reactive (but interactive) with the environment. As an example of a non-reactive (interactive) coating, pyrene in fluid toluene (carrier) can be applied to glass slides or optical disks to effect the light transmittance characteristics of the glass disk in the presence of explosives. As an example of a reactive coating, polysulfones can be applied via fluid toluene or methylene chloride to glass slides or optical disks such that the sulfones react with acid or base media, and can be used as sensors.

Catalytic coatings, or coatings that interact chemically with the surrounding environment in a manner wherein the coating behaves as a catalyst in a chemical reaction, can also be formed. An example of a catalytic coatings includes the dissolving of silver chloride and a beta-diketone in fluid carbon dioxide. Thereafter the mixture is directed onto a substrate in the presence of hydrogen. Silver metal will be deposited onto the surface of the substrate and can behave as a catalyst. Additionally, chloroplatinic acid can be applied to carbon cloth, mesh, or matting in accordance with the principals of the present invention. After such a deposition, sodium borohydride can be applied to reduce the platinum to the metallic state. Thus, the coating can be used as a catalyst. Additionally, other salts, solvents, complexing agents, substrates and reducing agents can yield similar results.

Conductive coatings refers to functional coatings that are thermally or electrically conductive. This includes coatings that are metallic, inorganic, organic, or polymeric in nature and/or composition. Metal coatings may be applied directly by coating the metal onto a substrate, or formed indirectly by applying a reactive coating containing the metal in a chemical state that can later be changed to make the coating conductive. For example, a substrate can be coated with a metal-containing flux (e.g. lead in zinc chloride) in fluid alcohol, after which, the coating can be heated or exposed to a chemical environment that would reduce the metal-containing flux to the metallic state (lead in this case). This process would produce "tinned" substrates suitable for soldering applications. Alternatively, a substrate can be coated with a sulfonated polystyrene in fluid acetone. Thus, when exposed to water, it will become electrically conductive. It would be appreciated to one skilled in the art that the use of other metal salts, fluxes, solvents, polymers, etc., will give similar results.

Generally, there are two broad categories of substrate modifications (outside of coating) that can be effectuated which include physical and chemical modification. Physical modifications refers to those modifications that are primarily characterized by, or made to enhance, physical characteristics of the substrate through application of the invention, but not through applying a coating per se. Examples of which are included herein.

Expanded materials include substrates that can be passed through a device like unto the device described herein under fluid pressure, whereupon exiting a higher the pressure region and entering another lower pressure region can cause rapid expansion of the substrate as a fluid is expanded out of the substrate. An example would be to pass a Plexiglas [poly(methyl methacrylate)] substrate through the device pressurized with fluid methylene chloride and hexane, whereupon exiting into a lower pressure region will cause expansion of the Plexiglas.

With regard to impregnation, suspended particulate material can be forced to impregnate a substrate by applying the particulate under pressure as a suspension in a fluid through a constriction or other type of opening that is at a near-contact distance from the substrate. An example would be to use nano-sized graphite particulate suspended in fluid mineral oil that is then applied under pressure to impregnate low-density polyethylene. Alternatively, a metal salt can be dissolved into a fluid and applied to a substrate that has some solubility in the fluid. Then the metal salt can also be converted to the metallic state by appropriate chemistry (reduction or oxidation), resulting in the metal being impregnated into the substrate. An example of this would be to dissolve silver chloride into fluid water acetone mixture and apply this mixture to a poly(methyl methacrylate) substrate. Next, by contacting the coating with a hydrogen or sodium borohydride, reduction will occur and reduce the silver to the metallic state while imbedded within the substrate.

With respect to chemical modification, the chemical characteristics of the substrate can be altered or enhanced. Examples include extraction and surface functionalization. Extractions apply to the removal of some component, such as a soluble component, from the substrate. An example would be to remove a plasticizer, monomer units, or unwanted oligomers from polymer substrates. One application would be to extract unwanted contaminants from soil or other environmental matrices such as removing crude oil from sand and soils where spills have occurred by applying alcohol or hexane in fluid form to a soil as it passed through the device. With respect to surface functionalization, a process and resultant state wherein the surface of the substrate is chemically modified can be accomplished. An example includes the passing of a cellulose substrate through a device described herein and expose it to one or more of fluid nitric acid, phosphoric acid, sulfuric acid to produce nitrated, phosphated, sulfated cellulose, respectively. The nitrated cellulose could be used in explosives while the phosphated or sulfated cellulose could be used as ion-exchange material.

The current processes will provide coatings and other modifications with superior properties because of improved adhesion, bonding, and chemical reactivity or extraction. Exposure to the fluids during the application processes can also exert a cleaning influence on a substrate, removing surface contaminants that detrimentally affect the ultimate properties of the final product. It is anticipated that these processes can reduce failure rates and defects, and products with superior properties, such as tensile strength can be produced. Additionally, these processes provide opportunities for application of thermally labile or otherwise sensitive chemical compositions to a variety of substrates.

While the invention has been described with reference to certain preferred embodiments, those skilled in the art will appreciate that various modifications, changes, omissions and substitutions can be made without departing from the spirit of the invention. It is intended, therefore, that the invention be limited only by the following claims construed as broadly as applicable law allows including all proper equivalents thereof.

We claim:

1. A system for applying a modifying composition differently sized and shaped substrates, comprising:
   a processing chamber configured for passing differently sized and shaped substrates therethrough, the processing chamber comprising:
   a first region;
   a second region;
   a constricted medial region between the first region and the second region;
   a first baffle separating the first region from the constricted medial region, the first baffle having an adjustable aperture sizable and configurable to accept the differently sized and shaped substrates;
   a second baffle separating the second region from the constricted medial region, the second baffle having an adjustable aperture sizable and configurable to accept the differently sized and shaped substrates; and
   wherein the processing chamber is further configured to accept a treatment mixture thereinto during movement of the differently sized and shaped substrates therethrough, where the treatment mixture comprises a modifying composition in a carrier medium selected from the group consisting of a supercritical fluid, a near-critical fluid, a superheated fluid, a superheated liquid, and a liquefied gas, the processing chamber being configured to initiate a pressure drop in the treatment mixture such that the modifying composition is released from the carrier medium and applied to the differently sized and shaped substrates within the processing chamber;

an entry seal in communication with the first region of the processing chamber, the entry seal comprising at least one entry seal baffle having an adjustable aperture sizable and configurable to accept the differently sized and shaped substrates; and an exit seal in communication with the second region, the exit seal comprising at least one exit seal baffle having an adjustable aperture sizable and configurable to accept the differently sized and shaped substrates.

2. The system of claim 1, further comprising a substrate feed controller configured for controlling a speed at which the differently sized and shaped substrates may be passed through the system.

3. A system for applying a modifying composition to different substrates, comprising:

an entry seal, wherein the entry seal includes an entry seal baffle which is adjustable to a different size and shape for allowing different substrates to pass therethrough;

a processing chamber in communication with the entry seal and configured to allow movement of the different substrates through the processing chamber, wherein the processing chamber comprises an entry processing chamber baffle allowing entry of the different substrates into the processing chamber, a constricted area for reducing the pressure of a treatment mixture introduced into the processing chamber, and an exit processing chamber baffle allowing exit of the different substrates from the processing chamber;

an injector in communication with the processing chamber and configured to introduce the treatment mixture into the processing chamber, wherein the treatment mixture comprises a modifying composition in a carrier medium selected from the group consisting of a supercritical fluid, a near-critical fluid, a superheated fluid, a superheated liquid, and a liquefied gas;

an exit seal in communication with the processing chamber, wherein the exit seal includes an exit seal baffle which is adjustable to a different size and shape for allowing different substrates to pass therethrough; and a substrate feed controller configured to control a speed at which the different substrates are introduced into the entry seal.

4. The system of claim 3, wherein an aperture of the entry seal baffle is configured for passing therethrough the different substrates selected from the group consisting of sheet-like substrates, U-shaped substrates, corrugated substrates, irregularly shaped substrates and angled substrates.

5. The system of claim 4, wherein the aperture of the entry seal baffle is configured for passing therethrough the sheet-like substrate selected from the group consisting of a plate, a ribbon, a sheet, a screen, and a plied material.

6. The system of claim 3, further comprising at least one expansion chamber disposed between the entry seal and the processing chamber, and at least one expansion chamber disposed between the exit seal and the processing chamber.

7. The system of claim 6, wherein the entry seal and the exit seal comprise fluid filled chambers configured to maintain a pressure that is at least slightly greater than pressures in the expansion chambers.

8. The system of claim 6, wherein the entry seal and the exit seal are each configured to maintain a pressure that is at least slightly greater than the adjacent expansion chambers by continuous inflow of a fluid.

9. The system of claim 8, wherein the entry seal and the exit seal are each configured to maintain a pressure that is at least slightly greater than pressures in the adjacent expansion chambers by continuous inflow of a fluid that is inert with respect to the treatment mixture.

10. The system of claim 3, further comprising a pressure regulator configured for controlling pressure in the processing chamber.

11. The system of claim 3, further comprising a temperature regulator configured for controlling temperature in the processing chamber.

12. The system of claim 3, wherein the entry seal baffle comprises an aperture configured to allow multiple equidimensionally cross-sectioned structures to pass therethrough simultaneously when arranged in an adjacent manner so as to present a non-equidimensional cross-sectional footprint in the direction co-linear to the travel of the arranged equidimensionally cross-sectioned structures.

13. The system of claim 12, wherein the aperture comprises an aperture configured for passing multiple equidimensionally cross-sectioned structures therethrough simultaneously when arranged in a side-by-side manner, a top-to-bottom manner, or encircled about each other.

* * * * *